(12) United States Patent
Parkin

(10) Patent No.: US 8,840,750 B2
(45) Date of Patent: Sep. 23, 2014

(54) METHOD OF BONDING A LEADING EDGE SHEATH TO A BLADE BODY OF A FAN BLADE

(75) Inventor: Michael Parkin, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 176 days.

(21) Appl. No.: 13/408,290

(22) Filed: Feb. 29, 2012

(65) Prior Publication Data

US 2013/0220537 A1   Aug. 29, 2013

(51) Int. Cl.
*B32B 7/12* (2006.01)
*F01D 5/14* (2006.01)

(52) U.S. Cl.
CPC .. *B32B 7/12* (2013.01); *F01D 5/147* (2013.01)
USPC ............ 156/307.1; 156/293; 156/307.7; 156/313; 416/224; 416/229 R; 416/229 A

(58) Field of Classification Search
CPC ........... B32B 7/12; F01D 5/141; F01D 5/147; F03D 1/0633; F03D 1/0675
USPC ............ 156/313, 304.3, 307.1, 330, 79, 293, 156/306.9, 307.7; 416/224, 229 R, 229 A
See application file for complete search history.

(56) References Cited

U.S. PATENT DOCUMENTS

| | | | |
|---|---|---|---|
| 3,762,835 A * | 10/1973 | Carlson et al. | 416/224 |
| 4,001,472 A * | 1/1977 | Thomas et al. | 428/109 |
| 5,174,024 A * | 12/1992 | Sterrett | 29/889.71 |
| 5,378,109 A | 1/1995 | Lallo et al. | |
| 5,985,127 A | 11/1999 | Greenslade | |
| 6,180,206 B1 | 1/2001 | Kain, Jr. | |
| 6,299,410 B1 | 10/2001 | Hilbert et al. | |
| 6,624,213 B2 | 9/2003 | George et al. | |
| 7,138,031 B2 | 11/2006 | Erickson et al. | |
| 7,204,682 B2 * | 4/2007 | Venturino et al. | 425/82.1 |
| 7,594,325 B2 | 9/2009 | Read | |
| 2007/0036659 A1 * | 2/2007 | Hibbard | 416/233 |
| 2008/0236739 A1 | 10/2008 | Ashley | |
| 2008/0253885 A1 * | 10/2008 | Foose et al. | 415/208.2 |
| 2011/0211965 A1 * | 9/2011 | Deal et al. | 416/223 R |

* cited by examiner

*Primary Examiner* — John Goff
*Assistant Examiner* — Scott W Dodds
(74) *Attorney, Agent, or Firm* — Carlson, Gaskey & Olds, P.C.

(57) ABSTRACT

A method of forming a fan blade includes the step of applying an adhesive layer around a leading edge of a fan blade body. The adhesive layer includes an adhesive film supported by a scrim cloth, and the adhesive layer contacts a portion of an inner surface of the fan blade body and a portion of an outer surface of the fan blade body. A leading edge sheath is positioned relative to the fan blade body such that a first flank and a second flank of the leading edge sheath is positioned over the portion of the inner surface and the portion of an outer surface, respectively, of the fan blade body. Pressure is applied to the first flank and the second flank of the leading edge sheath to secure the leading edge sheath to the blade body and curing the adhesive film.

20 Claims, 4 Drawing Sheets

METHOD OF BONDING A LEADING EDGE SHEATH TO A BLADE BODY OF A FAN BLADE

BACKGROUND OF THE INVENTION

A gas turbine engine includes a fan section that drives air along a bypass flowpath while a compressor section drives air along a core flowpath for compression and communication into a combustor section then expansion through a turbine section.

Fan blades are commonly made of titanium or carbon fiber. Titanium is strong, allowing a leading edge of the fan blade to protect the gas turbine engines from strikes from foreign objects.

A fan blade could be made of other materials, and a leading edge sheath can be attached to a blade body of a fan blade with an adhesive to strengthen the fan blade. The leading edge sheath can be attached to the blade body with a mold. However, due to its size, employing a mold increases the thermal mass in the autoclave, which could increase cure time of the adhesive.

SUMMARY OF THE INVENTION

A method of forming a fan blade according an exemplary aspect of the present disclosure includes, among other things, the steps of applying an adhesive layer around a leading edge of a fan blade body. The adhesive layer includes an adhesive film supported by a scrim cloth, and the adhesive layer contacts a portion of an inner surface of the fan blade body and a portion of an outer surface of the fan blade body. The method further includes the step of then positioning a leading edge sheath relative to the fan blade body such that a first flank of the leading edge sheath is positioned over the portion of the inner surface of the fan blade body and a second flank of the leading edge sheath is positioned over the portion of an outer surface of the fan blade body. The method further includes the steps of applying pressure to the first flank and the second flank of the leading edge sheath to secure the leading edge sheath to the blade body and curing the adhesive film.

In a further non-limiting embodiment of any of the forgoing method embodiments, the method may include a fan blade body made of aluminum or an aluminum alloy.

In a further non-limiting embodiment of any of the forgoing method embodiments, the method may include a leading edge sheath made of titanium or a titanium alloy.

In a further non-limiting embodiment of any of the forgoing method embodiments, the method may include an adhesive film that is an epoxy film.

In a further non-limiting embodiment of any of the forgoing method embodiments, the method may include a scrim cloth that is mesh.

In a further non-limiting embodiment of any of the forgoing method embodiments, the method may include a scrim cloth that is nylon.

In a further non-limiting embodiment of any of the forgoing method embodiments, the method may include the step of curing an adhesive film and the step of applying pressure to the first flank and the second flank of the leading edge sheath to secure the leading edge sheath to the blade body that occur simultaneously.

In a further non-limiting embodiment of any of the forgoing method embodiments, the method may include the steps of placing the leading edge sheath and the blade body in a vacuum bag and applying a vacuum to the vacuum bag.

In a further non-limiting embodiment of any of the forgoing method embodiments, the method may include the step of curing an adhesive film, the step of applying pressure to the first flank and the second flank of the leading edge sheath to secure the leading edge sheath to the blade body, and the step of applying a vacuum that occur simultaneously.

In a further non-limiting embodiment of any of the forgoing method embodiments, the method may include the step of applying pressure to the first flank and the second flank of the leading edge by an autoclave.

In a further non-limiting embodiment of any of the forgoing method embodiments, the method may include the step of applying an additional piece of material over the adhesive layer.

In a further non-limiting embodiment of any of the forgoing method embodiments, the method may include an additional piece of material that is fiberglass.

Another method of forming a fan blade according an exemplary aspect of the present disclosure includes, among other things, the step of applying an adhesive layer around a leading edge of a fan blade body. The adhesive layer includes an adhesive film supported by a scrim cloth, the adhesive layer contacts at least a portion of an inner surface of the fan blade body and at least a portion of an outer surface of the fan blade body, the fan blade body is made of aluminum or an aluminum alloy, and the adhesive film is an epoxy film. The method further includes the step of then positioning a leading edge sheath relative to the fan blade body such that a first flank of the leading edge sheath is positioned over the at least a portion of the inner surface of the fan blade body and a second flank of the leading edge sheath is positioned over at the least a portion of the outer surface of the fan blade body, where the leading edge sheath is made of titanium or a titanium alloy. The method further includes the steps of applying pressure to the first flank and the second flank of the leading edge sheath to secure the leading edge sheath to the blade body and curing the adhesive film.

In a further non-limiting embodiment of any of the forgoing method embodiments, the method may include a scrim cloth that is nylon.

In a further non-limiting embodiment of any of the forgoing method embodiments, the method may include the step of curing an adhesive film and the step of applying pressure to the first flank and the second flank of the leading edge sheath to secure the leading edge sheath to the blade body that occur simultaneously.

In a further non-limiting embodiment of any of the forgoing method embodiments, the method may include the steps of placing the leading edge sheath and the blade body in a vacuum bag and applying a vacuum to the vacuum bag.

In a further non-limiting embodiment of any of the forgoing method embodiments, the method may include the step of curing an adhesive film, the step of applying pressure to the first flank and the second flank of the leading edge sheath to secure the leading edge sheath to the blade body, and the step of applying a vacuum that occur simultaneously.

In a further non-limiting embodiment of any of the forgoing method embodiments, the method may include the step of applying pressure to the first flank and the second flank of the leading edge by an autoclave.

In a further non-limiting embodiment of any of the forgoing method embodiments, the method may include the step of applying an additional piece of material over the adhesive layer.

In a further non-limiting embodiment of any of the forgoing method embodiments, the method may include an additional piece of material that is fiberglass.

These and other features of the present invention can be best understood from the following specification and drawings, the following of which is a brief description.

DETAILED DESCRIPTION OF THE PREFERRED EMBODIMENTS

Figure 1:
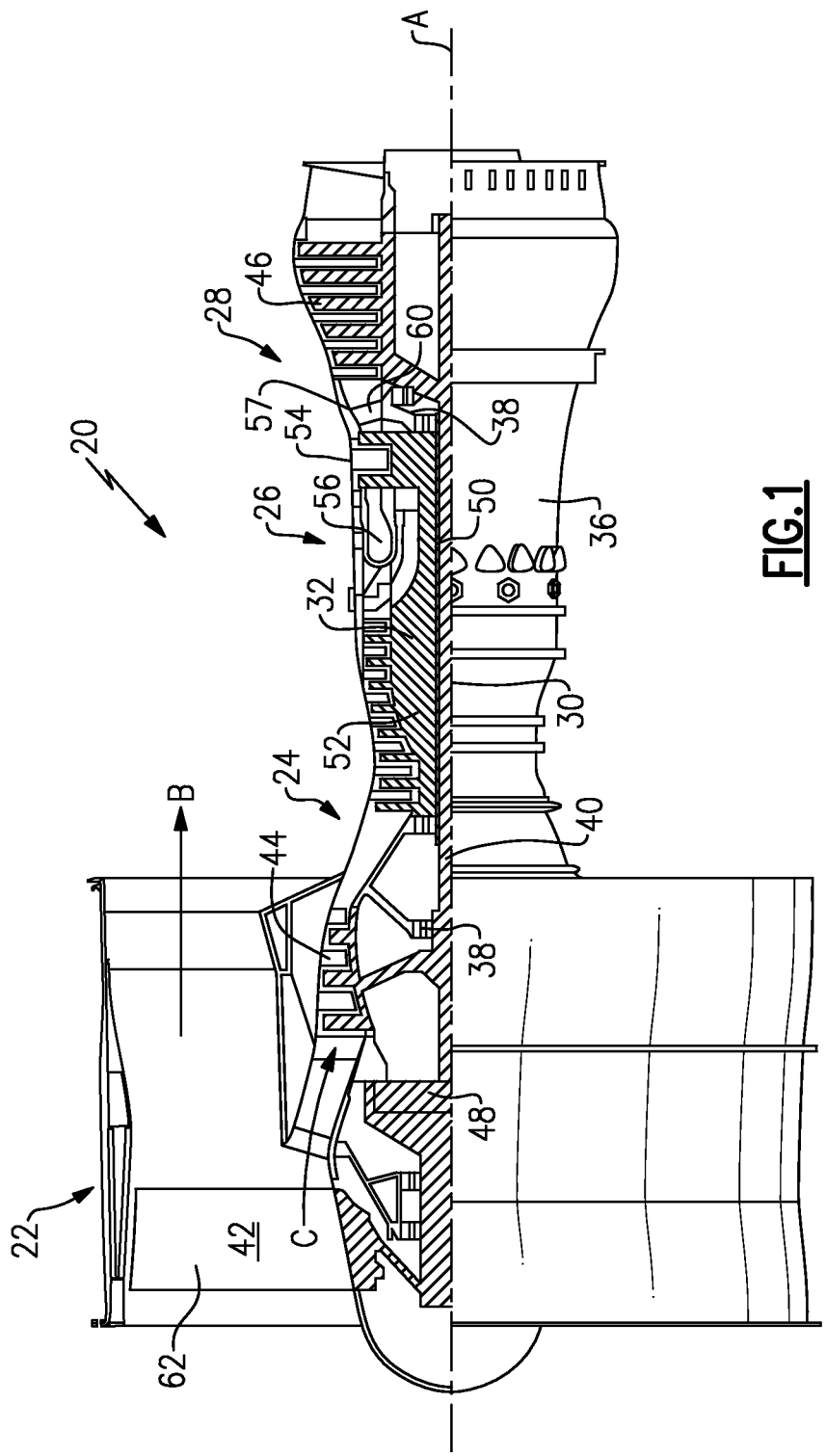
FIG. 1 illustrates a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures.

The fan section 22 drives air along a bypass flowpath B while the compressor section 24 drives air along a core flowpath C for compression and communication into the combustor section 26 then expansion through the turbine section 28.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54.

A combustor 56 is arranged between the high pressure compressor 52 and the high pressure turbine 54.

A mid-turbine frame 58 of the engine static structure 36 is arranged generally between the high pressure turbine 54 and the low pressure turbine 46. The mid-turbine frame 58 further supports bearing systems 38 in the turbine section 28.

The inner shaft 40 and the outer shaft 50 are concentric and rotate via bearing systems 38 about the engine central longitudinal axis A, which is collinear with their longitudinal axes.

The core airflow C is compressed by the low pressure compressor 44, then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion.

The engine 20 is in one example a high-bypass geared aircraft engine. In a further example, the engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

In one disclosed embodiment, the engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.5 (2.5:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 feet (10,668 meters), with the engine at its best fuel consumption, also known as "bucket cruise Thrust Specific Fuel Consumption ('TSFC')," is the industry standard parameter of lbm of fuel being burned divided by lbf of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.45.

"Low corrected fan tip speed" is the actual fan tip speed in feet per second divided by an industry standard temperature correction of $[(Tambient\ deg\ R)/518.7)^{0.5}]$. The "Low corrected fan tip speed" as disclosed herein according to one non-limiting embodiment is less than about 1150 feet per second (351 meters per second).

Figure 2:
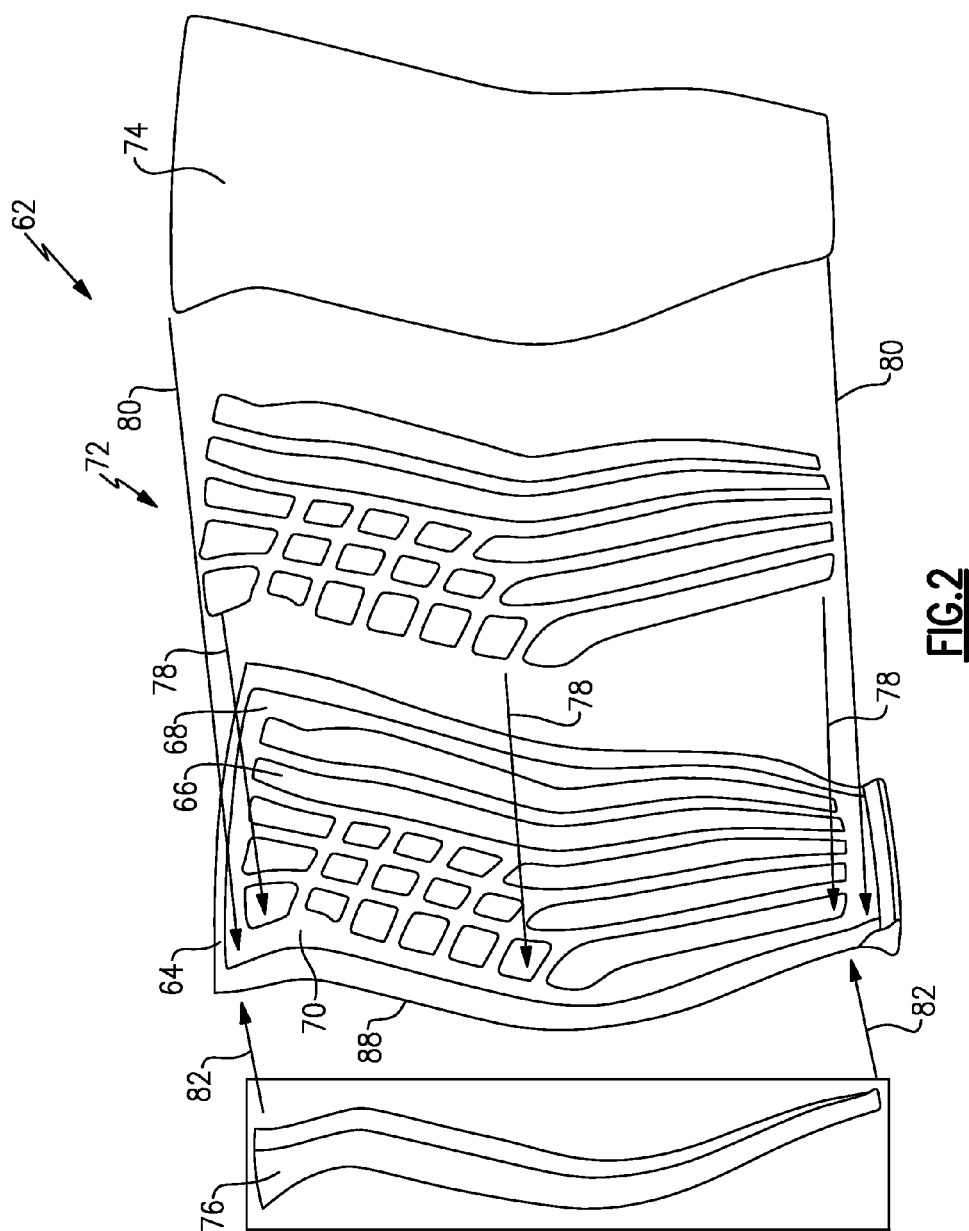
FIG. 2 illustrates an exploded view of a fan blade.

The fan 42 includes a plurality of hybrid metallic fan blades 62. As shown in FIG. 2, each fan blade 62 includes a blade body 64 having an inner surface 70 including a plurality of cavities 66, such as grooves or openings, surrounded by ribs 68. A plurality of strips or pieces of a low density filler 72 are each sized to fit in one of the plurality of cavities 66. The fan blade 62 also includes a cover 74 and a leading edge sheath 76 attached to the blade body 64.

In one example, the blade body 64 is made of aluminum or an aluminum alloy. Employing aluminum or an aluminum alloy for the blade body 64 and the cover 74 provides a weight and cost savings. There is one strip or piece of the low density filler 72 for each of the plurality of cavities 66 of the blade body 64. In one example, the low density filler 72 is foam. In one example, the foam is aluminum foam. The low density filler 72 is secured in the cavities 66 with an adhesive 78, shown schematically as arrows. In one example, the adhesive 78 is urethane. In another example, the adhesive 78 is an epoxy film.

The cover 74 is then secured to the blade body 64 with an adhesive 80, shown schematically as arrows. In one example, the adhesive 80 is urethane. In one example, the cover 74 is made of aluminum or an aluminum alloy. The adhesive 80 then cured during a bonding cure cycle in a pressure vessel.

The leading edge sheath 76 is then attached to the blade body 64 with an adhesive layer 82. In one example, the adhesive layer 82 includes an adhesive film supported by a scrim cloth. In one example, the adhesive film is an epoxy film. In one example, the scrim cloth is nylon. In one example, the scrim cloth is mesh in structure. In one example, the leading edge sheath 76 is made of titanium or a titanium alloy. The adhesive film in the adhesive layer 82 is then cured during a sheath bonding cure cycle in an autoclave.

Figure 3:
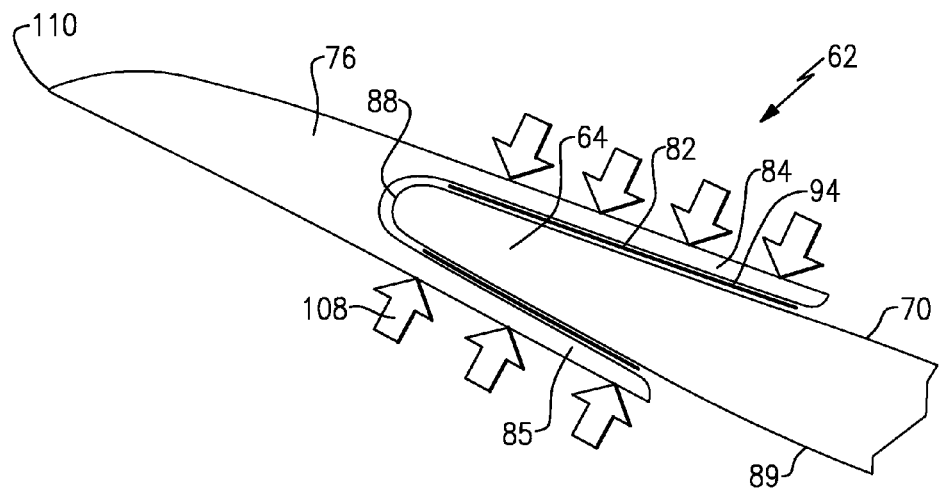
FIG. 3 illustrates a side view of a leading edge sheath attached to a blade body with a scrim cloth and adhesive therebetween.
Figure 4:
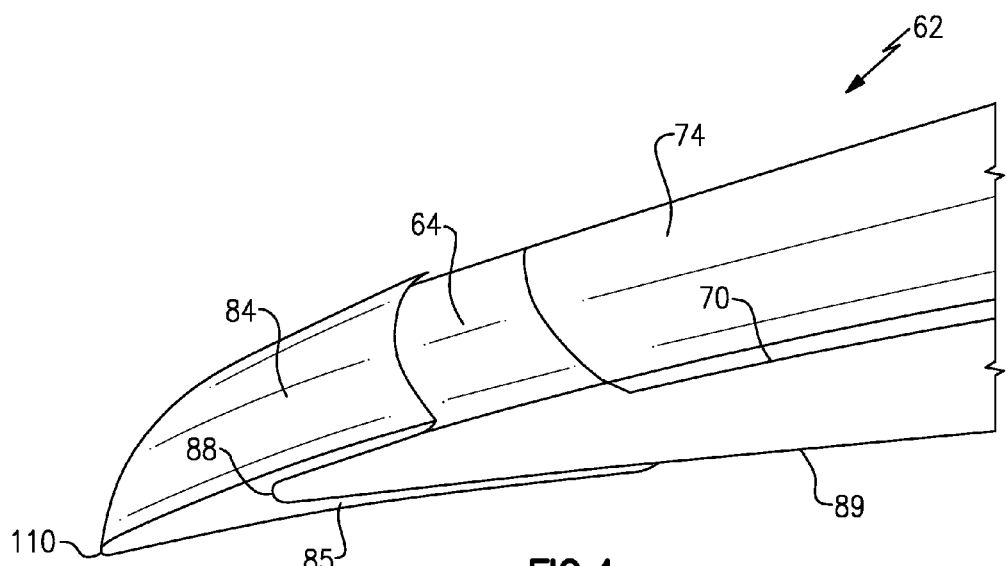
FIG. 4 illustrates a side view of the fan blade.

The leading edge sheath 76 provides additional strength (for example, for bird-strike events) to the fan blade 62 (made of a lighter material) and is more resistant to erosion than the aluminum or aluminum alloy of the blade body 64. As shown in FIGS. 3 and 4, the leading edge sheath 76 includes a first sheath flank 84 and a second sheath flank 85. When the leading edge sheath 76 is applied to a leading edge 88 of the blade body 64, the first sheath flank 84 is located over the inner surface 70 of the blade body 64, and the second sheath flank 84 is located over an outer surface 89 of the blade body 64.

When attaching the leading edge sheath 76 to the blade body 64, the adhesive layer 82 is applied to the blade body 64. In one example, the adhesive layer 82 is folded over the leading edge 88 of the blade body 64 and covers the inner surface 70 and the outer surface 89 of the blade body 64 near the leading edge 88.

In one example, an additional piece of material (not shown) can be folded over the adhesive layer 82. In one example, the additional piece of material is fiberglass. The additional piece of material can be woven or non-woven.

The leading edge sheath 76 is then positioned such that the first sheath flank 84 is positioned over the inner surface 70 of the blade body 64, and the second sheath flank 85 is positioned over the outer surface 89 of the blade body. The scrim cloth of the adhesive layer 82 retains the adhesive film between the leading edge sheath 76 and the blade body 64. A gap 94 is defined between the leading edge sheath 76 and the blade body 64, and the adhesive layer 82 fills in the gap 94 once the adhesive film is cured. In FIG. 3, the gap 94 is shown in an exaggerated manner for illustrative purposes only.

Figure 5:
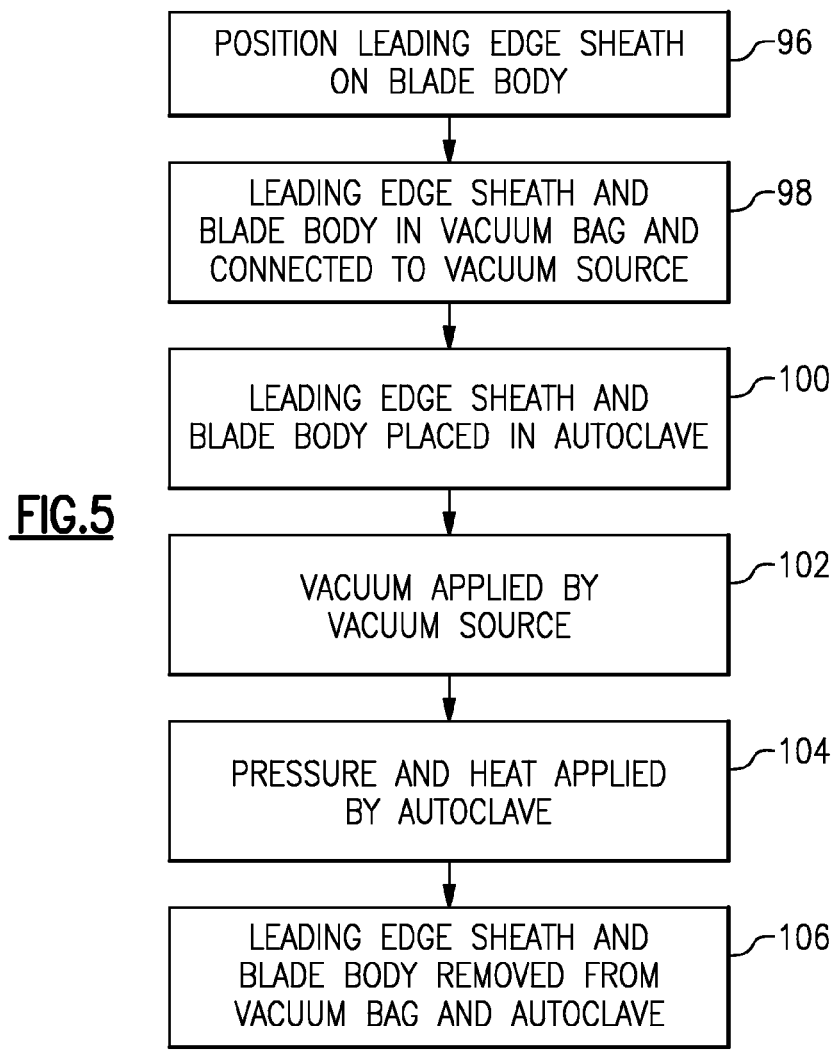
FIG. 5 illustrates a method of attaching the leading edge sheath to the blade body.

As shown in FIG. 5, in step 96, the leading edge sheath 76 is positioned on the blade body 64 with the adhesive layer 82 therebetween. In step 98, the leading edge sheath 76 and the blade body 64 are sealed in a vacuum bag and connected to a vacuum source. In step 100, the leading edge sheath 76 and the blade body 64 are then placed in an autoclave. In step 102, a vacuum is applied to the vacuum bag by the vacuum source to evacuate the vacuum bag of air.

In step 104, pressure 108 (shown in FIG. 3) and heat is then applied by the autoclave, and the adhesive film in the adhesive layer 82 cures simultaneously. In one example, the autoclave applies about 90 psi of pressure at a temperature of about 250° F. (121.1° C.) for at least about 2 hours. The increased pressure applied to the leading edge sheath 76 during bonding and exposure to the high pressure allows the leading edge sheath 76 to float and self-center, forcing the flanks 84 and 85 of the leading edge sheath 76 against the blade body 64. The leading edge sheath 76 is then properly aligned with the blade body 64 without the use of external tooling. In step 106, the attached leading edge sheath 76 and the blade body 64 are then removed from the vacuum bag and the autoclave. Once attached, the leading edge sheath 76 defines a leading edge 110 of the fan blade 62

Figure 6:
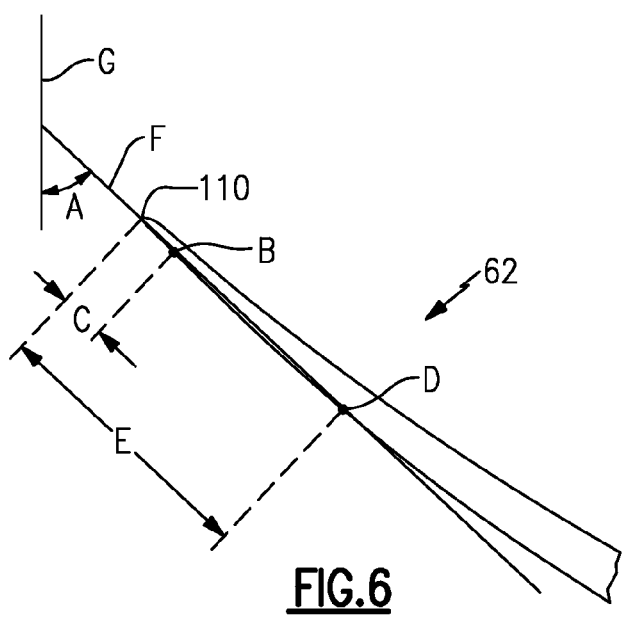
FIG. 6 illustrates how an A angle of the fan blade is defined.

As shown in FIG. 6, it is important that the bonding of the leading edge sheath 76 with the blade body 64 is precise to ensure that the A angle, which is defined by the alignment of the leading edge sheath 76 on the blade body 64, is within a tolerated range. A desired A angle is associated with each fan blade 62.

A location B is defined at a distance C from the leading edge 110 of the fan blade 62, and a location D is defined at a distance E from the leading edge 110 of the fan blade 62. In one example, the distance C is 0.430 inch (1.09 cm), and the distance D is 2.580 inch (6.55 cm). A line F passes through the location B and the location D. The line F intersects a plane G that is substantially vertical. The actual A angle is the angle defined at the intersection of the line F and the plane G. The desired A angle is compared to the actual A angle. If a difference between the desired A angle and the actual A angle are within a tolerance range, this means that the leading edge sheath 76 is properly aligned with the blade body 64. In one example, the difference is about 1° or less.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A method for forming a fan blade, the method comprising the steps of:
   applying an adhesive layer around a leading edge of a fan blade body, wherein the adhesive layer includes an adhesive film supported by a scrim cloth, and the adhesive layer contacts a portion of an inner surface of the fan blade body and a portion of an outer surface of the fan blade body;
   then positioning a leading edge sheath relative to the fan blade body such that a first flank of the leading edge sheath is positioned over the portion of the inner surface of the fan blade body and a second flank of the leading edge sheath is positioned over the portion of an outer surface of the fan blade body, wherein there is a gap between the leading edge sheath and the fan blade body;
   applying pressure to the first flank and the second flank of the leading edge sheath to secure the leading edge sheath to the blade body; and
   curing the adhesive film, wherein the step of curing the adhesive expands the adhesive film to fill the gap.

2. The method as recited in claim 1 wherein the fan blade body is made of aluminum or an aluminum alloy.

3. The method as recited in claim 1 wherein the leading edge sheath is made of titanium or a titanium alloy.

4. The method as recited in claim 1 wherein the adhesive film is an epoxy film.

5. The method as recited in claim 1 wherein the scrim cloth is mesh.

6. The method as recited in claim 1 wherein the scrim cloth is nylon.

7. The method as recited in claim 1 wherein the step of curing the adhesive film and the step of applying pressure to the first flank and the second flank of the leading edge sheath to secure the leading edge sheath to the blade body occur simultaneously.

8. The method as recited in claim 1 further including the steps of placing the leading edge sheath and the blade body in a vacuum bag and applying a vacuum to the vacuum bag.

9. The method as recited in claim 8 wherein the step of curing the adhesive film, the step of applying pressure to the first flank and the second flank of the leading edge sheath to secure the leading edge sheath to the blade body, and the step of applying a vacuum occur simultaneously.

10. The method as recited in claim 1 wherein the step of applying pressure to the first flank and the second flank of the leading edge is performed by an autoclave.

11. The method as recited in claim 1 including the step of applying an additional piece of material over the adhesive layer.

12. The method as recited in claim 11 wherein the additional piece of material is fiberglass.

13. A method for forming a fan blade, the method comprising the steps of:
   applying an adhesive layer around a leading edge of a fan blade body, wherein the adhesive layer includes an adhesive film supported by a scrim cloth, the adhesive layer contacts a portion of an inner surface of the fan blade body and a portion of an outer surface of the fan blade body, the fan blade body is made of aluminum or an aluminum alloy, and the adhesive film is an epoxy film;
   then positioning a leading edge sheath relative to the fan blade body such that a first flank of the leading edge sheath is positioned over the portion of the inner surface of the fan blade body and a second flank of the leading edge sheath is positioned over at the least a portion of the outer surface of the fan blade body, wherein the leading edge sheath is made of titanium or a titanium alloy, wherein there is a gap between the leading edge sheath and the fan blade body;
   applying pressure to the first flank and the second flank of the leading edge sheath to secure the leading edge sheath to the blade body; and
   curing the adhesive film, and the step of curing the adhesive expands the adhesive film to fill the gap.

14. The method as recited in claim 13 wherein the scrim cloth is nylon.

15. The method as recited in claim 13 wherein the step of curing the adhesive film and the step of applying pressure to the first flank and the second flank of the leading edge sheath to secure the leading edge sheath to the blade body occur simultaneously.

16. The method as recited in claim 13 further including the steps of placing the leading edge sheath and the blade body in a vacuum bag and applying a vacuum to the vacuum bag.

17. The method as recited in claim 16 wherein the step of curing the adhesive film, the step of applying pressure to the first flank and the second flank of the leading edge sheath to secure the leading edge sheath to the blade body, and the step of applying a vacuum occur simultaneously.

18. The method as recited in claim 13 wherein the step of applying pressure to the first flank and the second flank of the leading edge is performed by an autoclave.

19. The method as recited in claim 13 including the step of applying an additional piece of material over the adhesive layer.

20. The method as recited in claim 19 wherein the additional piece of material is fiberglass.

* * * * *